United States Patent
Fan et al.

(10) Patent No.: US 7,337,161 B2
(45) Date of Patent: Feb. 26, 2008

(54) SYSTEMS AND METHODS FOR SEQUENTIAL MODELING IN LESS THAN ONE SEQUENTIAL SCAN

(75) Inventors: Wei Fan, New York, NY (US); Haixun Wang, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 10/903,336

(22) Filed: Jul. 30, 2004

(65) Prior Publication Data

US 2006/0026110 A1  Feb. 2, 2006

(51) Int. Cl.
  G06F 17/30 (2006.01)
(52) U.S. Cl. .......................... 707/1; 707/100
(58) Field of Classification Search ................ 707/100, 707/200, 1, 2
  See application file for complete search history.

(56) References Cited

U.S. PATENT DOCUMENTS 6,772,179 B2 * 8/2004 Chen et al. ................. 707/204
2005/0203930 A1 * 9/2005 Bukowski et al. .......... 707/100

OTHER PUBLICATIONS

Shafer, John, et al., "SPRINT: A Scalable Parallel Classifier for Data Mining," Proceedings of the 22nd VLDB Conference Mumbai (Bombay), India, 1996, pp. 1-12.

Hellerstein, Joseph M., et al., "Online Aggregation," ACM SIGMOD International Conference on Management of Data, May 1997, Tucson, Arizona, pp. 1-12.

Domingos, Pedro, et al., "Learning from Infinite Data in Finite Time," Department of Computer Science and Engineering, University of Washington, Seattle, WA 98185-2350, USA.

Gehrke, Johannes, et al., "BOAT—Optimistic Decision Tree Construction," SIGMOD '99, Philadelphia, PA, Copyright ACM 1999 1-58113-084-8/99/05, pp. 169-180.

Gehrke, Johannes, et al., "RainForest—A Framework for Fast Decision Tree Construction of Large Datasets," Proceedings of the 24th VLDB Conference, New York, USA, 1998.

Freund, Yoav, et al., "A Decision-Theoretic Generalization of On-Line Learning and an Application to Boosting," Proceedings of the Second European Conference on Computational Learning Theory, Barcelona, Mar. 1995, pp. 1-34.

Fan, Wei, et al., "A Framework for Scalable Cost-sensitive Learning Based on Combining Probabilities and Benefits," IBM T.J. Watson Research; Department of Computer Science, Columbia University.

Breiman, Leo, "Bagging Predictors," Department of Statistics, University of California, Berkeley, California 94720, pp. 1-19.

* cited by examiner

*Primary Examiner*—Cheryl Lewis
(74) *Attorney, Agent, or Firm*—Ference & Associates LLC

(57) ABSTRACT

Most recent research of scalable inductive learning on very large streaming dataset focuses on eliminating memory constraints and reducing the number of sequential data scans. However, state-of-the-art algorithms still require multiple scans over the data set and use sophisticated control mechanisms and data structures. There is discussed herein a general inductive learning framework that scans the dataset exactly once. Then, there is proposed an extension based on Hoeffding's inequality that scans the dataset less than once. The proposed frameworks are applicable to a wide range of inductive learners.

13 Claims, 4 Drawing Sheets

SYSTEMS AND METHODS FOR SEQUENTIAL MODELING IN LESS THAN ONE SEQUENTIAL SCAN

FIELD OF THE INVENTION

The present invention relates generally to sequential modeling in the interpretation of, and other extraction of information from, large quantities of data.

BACKGROUND OF THE INVENTION

Herebelow, numeral in square brackets—[ ]—are keyed to the numbered list of references found towards the end of the disclosure.

During the last two decades, our ability to collect and store data has significantly out-paced our ability to analyze, summarize and extract "knowledge" from the continuous stream of input. Traditional data mining methods that require all data to be held in memory are becoming inadequate. Securing an effective interface between data mining and very large database essentially requires scalability. The salability and accuracy of data mining methods are constantly being challenged by real-time production systems that generate tremendous amount of data continuously at unprecedented rate. Examples of such data streams include security buy-sell transactions, credit card transactions, phone call records, network event logs, etc.

A very significant characteristic of streaming data is "evolving pattern". In other words, both the underlying true model and distribution of instances evolve and change continuously over time. Streaming data is also characterized by large data volumes. Knowledge discovery on data streams has become a research topic of growing interest. A need has thus been recognized in connection with solving the following problem: given an infinite amount of continuous measurements, how do we model them in order to capture time-evolving trends and patterns in the stream, and make time critical decisions?

Most recent research on scaleable inductive learning over very large streaming dataset focuses on eliminating memory-constraints and reducing the number of sequential data scans, particularly for decision tree construction. State-of-the-art decision tree algorithms (SPRINT [9], RainForest [5], and later BOAT [6] among others) still scan the data multiple times, and employ rather sophisticated mechanisms in implementation. Most recent work [8] applies the Hoeffding inequality to decision tree learning on streaming data in which a node is reconstructed if it is statistically necessary. Outside of decision trees, there hasn't been much research on reducing the number of data scans for other inductive learners. A need has thus been recognized in connection with developing a general approach for a wide range of inductive learning algorithms to scan the dataset less than once (which can be interpreted as "less than one full time" or "less than one time in entirety"), and for the approach to be broadly applicable beyond decision trees to other learners, e.g., rule and naive Bayes learners.

"Ensemble of classifiers" has been studied as a general approach for scaleable learning. Previously proposed meta-learning [2] reduces the number of data scans to 2. However, empirical studies have shown that the accuracy of the multiple model is sometimes lower than respective single model. Bagging [1] and boosting [4] are not scalable since both methods scan the dataset multiple times. In this context, a need has thus been recognized in connection with being able to scan the dataset less than once and to provide higher accuracy than a single classifier.

SUMMARY OF THE INVENTION

In accordance with at least one presently preferred embodiment of the present invention, there is proposed, based on an averaging ensemble, a statistically-based multiple model inductive learning algorithm that scans a dataset less than once (the definition of which can be appreciated in the Background section hereinabove and also from the discussion presented herebelow).

Previous research [3] on averaging ensemble concept has shown that it is more efficient and accurate than both bagging and meta-learning. Herein, in accordance with at least one preferred embodiment of the present invention, there is applied the Hoeffding inequality to estimate the probability that the partial and complete model are equal in accuracy. When the probability is higher than a threshold, the algorithm stops model construction and returns the current model, resulting in less than one scan of the dataset.

Significant differences exist in comparison with [8] in terms of determining whether to change the shape of a decision tree. Unlike previous research [8, 6], the presently proposed methods and arrangements are not limited to decision trees, but are applicable to a wide range of inductive learners. When applied to decision tree learning, accuracy will be greater than in the case of a single decision tree. Another advantage is that the ensemble reduces the asymptotic complexity of the algorithm, in addition to simply scanning less data.

In summary, one aspect of the invention provides an arrangement for effecting inductive learning for a large data set, the arrangement comprising: an arrangement for scanning at least a portion of an input large data set; the scanning arrangement being adapted to undertake less than a full scan of the entire input large data set.

Another aspect of the invention provides a method of effecting inductive learning for a large data set, the method comprising the steps of: scanning at least a portion of an input large data set; the scanning step comprising undertaking less than a full scan of the entire input large data set.

Furthermore, an additional aspect of the invention provides a program storage device readable by machine, tangibly embodying a program of instructions executable by the machine to perform method steps for effecting inductive learning for a large data set, the method comprising the steps of: scanning at least a portion of an input large data set; the scanning step comprising undertaking less than a full scan of the entire input large data set.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1A:
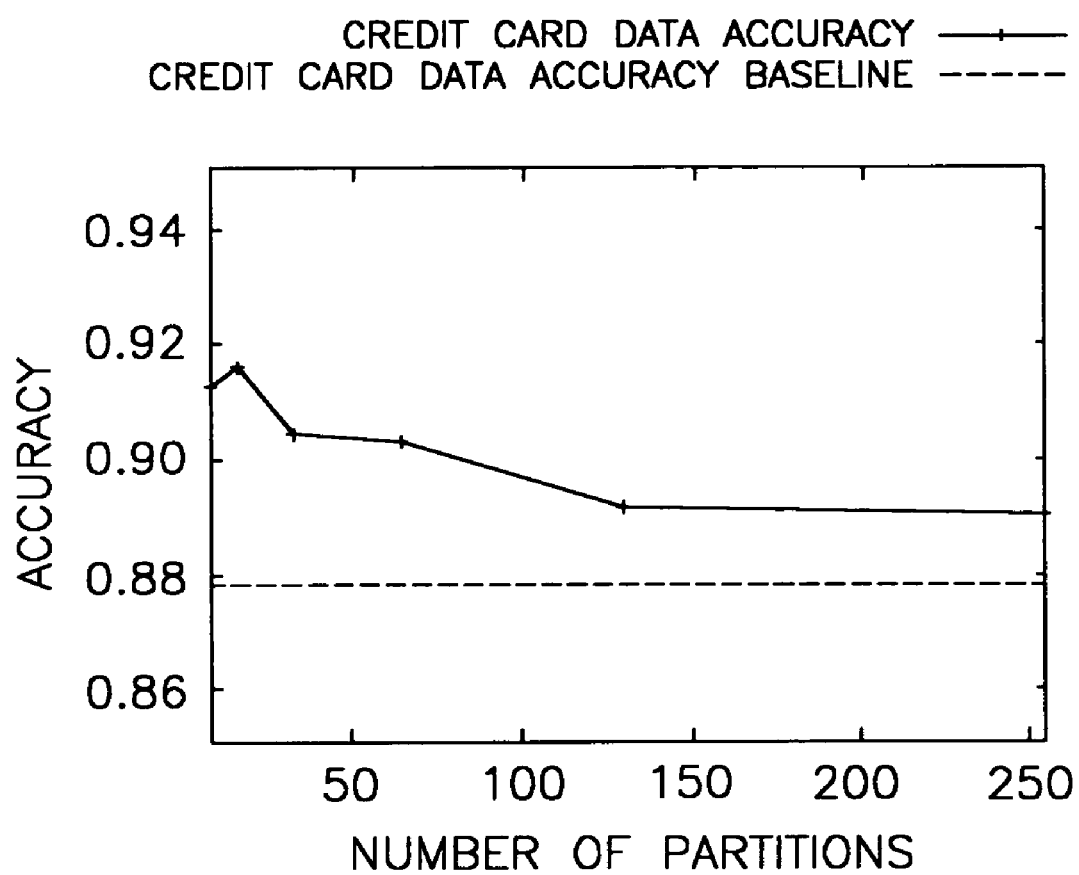
FIG. 1A is a plot of credit card data accuracy derived from experimentation.

We first describe a strawman algorithm that scans the data set exactly once, then propose the extension that scans the data set less than once. The strawman algorithm is based on probabilistic modeling.

Suppose $p(l_i|x)$ is the probability that x is an instance of class $l_i$. In addition, we have a benefit matrix b $[l_i, l_i]$ that records the benefit received by predicting an example of class $l_i$ to be an instance of class $l_j$. For traditional accuracy-based problems, $\forall i, b[l_i, l_i]=1$ and $\forall i' \neq i, b[l_{i'}, l_i]=0$. For cost-sensitive application such as credit card fraud detection, assume that the overhead to investigate a fraud is \$90 and y(x) is the transaction amount, then b[fraud, fraud]=y(x)-\$90 and b [¬fraud, fraud]=-\$90. Using benefit matrix and probability, the expected benefit received by predicting x to be an instance of class $l_i$ is $$\text{Expected Benefit: } e(l_i | x) = \sum_{l'_i} b[l'_i, l_i] \cdot p(l'_i | x) \quad (1)$$

Based on optimal decision policy, the best decision is the label with the highest expected benefit:

$$l_{max} = \arg\max_{l_i} e(l_i|x) \quad (2)$$

Assuming that l(x) is the true label of x, the accuracy of the decision tree on a test data set ST is $$\text{Accuracy: } A = \sum_{x \in ST} b[l(x), l_{max}] \quad (3)$$

For traditional accuracy-based problems, A is always normalized by dividing |ST|; for cost-sensitive problems, A is usually represented in some measure of benefits such as dollar amount. For cost-sensitive problems, we sometimes use "total benefits" to mean accuracy.

The strawman algorithm is based on averaging ensemble [3]. Assume that a data set S is partitioned into K disjoint subsets $S_j$ with equal size. A base level model $C_j$ is trained from each $S_j$. Given an example x, each classifier outputs individual expected benefit based on probability $p_j(l_i|x)$ $$e_j(l_i | x) = \sum_{l'_i} b[l'_i, l_i] \cdot p_j(l'_i | x) \quad (4)$$

The averaged expected benefit from all base classifiers is therefore $$E_K(l_i | x) = \frac{\sum_{1}^{K} e_j(l_i | x)}{K} \quad (5)$$

We then predict the class label with the highest expected return as in Eq[2].

$$\text{Optimal Decision: } L_K = \arg\max_{l_i} E_K(l_i|x) \quad (6)$$

A clear advantage is that the strawman algorithm scans the dataset exactly once as compared to two scans by meta-learning and multiple scans by bagging and boosting. In previous research [3], the accuracy by the strawman algorithm is also significantly higher than both meta-learning and bagging. [3] explains the statistical reason why the averaging ensemble is also more likely to have higher accuracy that a single classifier trained from the same dataset.

A "less-than-one-scan" algorithm, in accordance with at least one presently preferred embodiment of the present invention, returns the current ensemble with k(<K) number of classifiers when the accuracy of current ensemble is the same as the complete ensemble with high confidence. For a random variable y in the range of R=a−b with observed mean of $\overline{Y}$ after n observations, without any assumption about the distribution of y, Hoeffding's inequality states that with probability $\geq p$, the error of $\overline{Y}$ to the true mean is at most $$\varepsilon_n = R\left(\frac{1-f}{2n}\ln\left(\frac{1}{1-p}\right)\right)^{\frac{1}{2}} \quad (7)$$

For finite population of size N, the adjusted error is $$\varepsilon_n = R\left(\frac{1-f}{2n}\ln\left(\frac{1}{1-p}\right)\right)^{\frac{1}{2}} \text{ where } f = \frac{n}{N} \quad (8)$$

The range R of expected benefit for class label $l_i$ can be found from the index to the data, or predefined. When k base models are constructed, the Hoeffding error $\varepsilon_k$ can be computed by using Eq[8]. For data example x, assume that $E(l_a|x)$ is the highest expected benefit and $E(l_b|x)$ is the second highest, $\varepsilon_k(l_a)$ and $\varepsilon_k(l_b)$ are the Hoeffding errors. If $E(l_a|x)-\varepsilon_k(l_a)>E(l_b|x)+\varepsilon_k(l_b)$ or $E(l_a|x)-E(l_b|x)>\varepsilon_k(l_a)+\varepsilon_k(l_b)$, with confidence $\geq p$, the prediction on x by the complete multiple model and the current multiple model is the same. Otherwise, more base models will be trained. The algorithm is summarized in Algorithm 1 (all algorithms appear in the Appendix hereto).

If an example x satisfies the confidence p when k classifiers are computed, there is no utility to check its satisfaction when more classifiers are computed. This is because that an ensemble with more classifiers is likely to be a more accurate model. In practice, we can only read and keep one example x from the validation set in memory at one time. We only read a new instance from the validation set if the current set of classifiers satisfy the confidence test. In addition, we keep only the predictions on one example at any given time. This guarantees that the algorithm scans the validation dataset once with nearly no memory requirement.

The extra overhead of the Holding-based less than one scan algorithm is the cost for the base classifiers to predict on the validation set and calculate the statistics. All these can be done in main memory. As discussed above, we can predict on one example from the validation set at any given time. Assume that we have k classifiers at the end and n is the size of the validation set, the total number of predictions is approximately n×k/2 on average. The calculation of both averaging and standard deviation can be done incrementally. We only need to keep $\Sigma X_i$ and $\Sigma X_i^2$ for just one example at anytime and calculate as follows:

$$\overline{X} = \frac{\sum X_i}{k} \quad (9)$$

$$\sigma^2(X) = \frac{\sum X_i^2 - k \cdot \overline{X}^2}{k-1} \quad (10)$$

The average number of arithmetic operation is approximately $$3 \times \frac{n \times k}{2}.$$

The problem that the proposed algorithm solves is one in which the training set is very large and the I/O cost of data scan is the major overhead. When I/O cost is the bottle neck, the extra cost of prediction and statistical analysis is minimum.

To illustrate the effectiveness of at least one embodiment of the present invention by way of experimentation, we first compare the accuracy of the complete multiple model (one scan as well as less than one scan) and the accuracy of the single model trained from the same data set. We then evaluate the amount of data scan and accuracy of the less than one scan algorithm as compared to the one scan models. Additionally, we generate a dataset with biased distribution and study the results of the less than one scan algorithm.

The first one is the famous donation data set that first appeared in KDDCUP'98 competition (the 1998 Knowledge Discovery and Data Mining Cup Competition). Suppose that the cost of requesting a charitable donation from an individual x is $0.68, and the best estimate of the amount that x will donate is Y(x)Y (x). Its benefit matrix is:

|  | predict donate | predict ¬donate |
| --- | --- | --- |
| actual donate | Y(x) - $.0.68 | 0 |
| actual ¬donate | -$0.68 | 0 |

As a cost-sensitive problem, the total benefit is the total amount of received charity minus the cost of mailing. The data has already been divided into a training set and a test set. The training set consists of 95,412 records for which it is known whether or not the person made a donation and how much the donation was. The test set contains 96,367 records for which similar donation information was not published We used the standard training/test set splits to compare with previous results. The feature subsets were based on the KDDCUP'98 winning submission. To estimate the donation amount, we employed the multiple linear regression method.

The second data set is a credit card fraud detection problem. Assuming that there is an overhead $90 to dispute and investigate a fraud and y(x) is the transaction amount, the following is the benefit matrix:

|  | predict fraud | predict ¬fraud |
| --- | --- | --- |
| actual fraud | y(x) - $90 | 0 |
| actual ¬fraud | ~$90 | 0 |

As a cost-sensitive problem, the total benefit is the sum of recovered frauds minus investigation costs. The data set was sampled from a one year period and contains a total of 5 million transaction records. We use data of the last month as test data (40,038 examples) and data of previous months as training data (406,009 examples).

The third data set is the adult data set from UCI repository. For cost-sensitive studies, we artificially associate a benefit of $2 to class label F and a benefit of $1 to class label N, as summarized below:

|  | predict F | predict N |
| --- | --- | --- |
| actual F | $2 | 0 |
| actual N | 0 | $1 |

We use the natural split of training and test sets, so the results can be easily duplicated. The training set contains 32,561 entries and the test set contains 16,281 records.

By way of experimental setup, there were selected three learning algorithms, decision tree learner C4.5, rule builder RIPPER, and a naive Bayes learner. (These three algorithms are described in detail in the following publications, respectively: Quinlan, R., "C4.5: Programs for Machine Learning", Morgan Kaufman, 1993; Cohen, W., "A Fast Rule Induction Algorithm", Proceeedings of 1995 International Conferences on Machine Learning; and Mitchell, T., "Machine Learning", McGraw Hill, 1997.) We have chosen a wide range of partitions, K∈{8,16,32,64,128,256}. The validation dataset SV is the complete training set. All reported accuracy results were run on the test dataset.

In Tables 1 and 2 (all tables appear in the Appendix hereto), we compare the results of the single classifier (which is trained from the complete dataset as a whole), one scan algorithm, and the less than one scan algorithm. We use the original "natural order" of the dataset. Later on, we use a biased distribution. Each data set under study is treated both as a traditional and cost-sensitive problem. The less than one scan algorithm is run with confidence p=99.7%.

The baseline traditional accuracy and total benefits of the single model are shown in the two columns under "single" in Tables 1 and 2. These results are the baseline that the one scan and less than one scan algorithms should achieve. For the one scan and less than one scan algorithm, each reported result is the average of different multiple models with K ranging from 2 to 256. In Tables 1 and 2, the results are shown in two columns under accuracy and benefit As we compare the respective results in Tables 1 and 2, the multiple model either significantly beat the accuracy of the single model or have very similar results. The most significant increase in both accuracy and total benefits is for the credit card data set. The total benefits have been increased by approximately $7,000-$10,000; the accuracy has been increased by approximately 1%~3%. For the KDDCUP'98 donation data set, the total benefit has been increased by $1400 for C4.5 and $250 for NB.

Figure 1B:
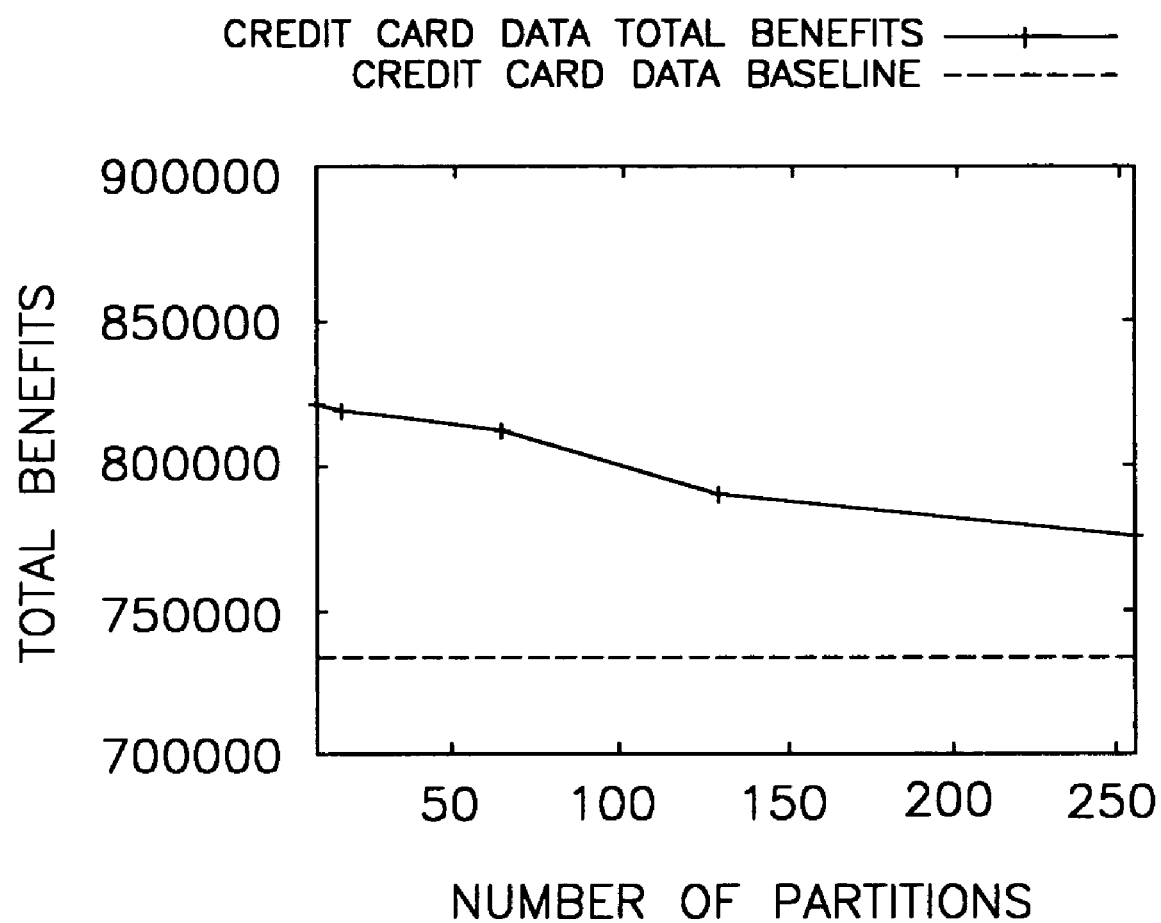
FIG. 1B is a plot of credit card benefits derived from experimentation.
Figure 1C:
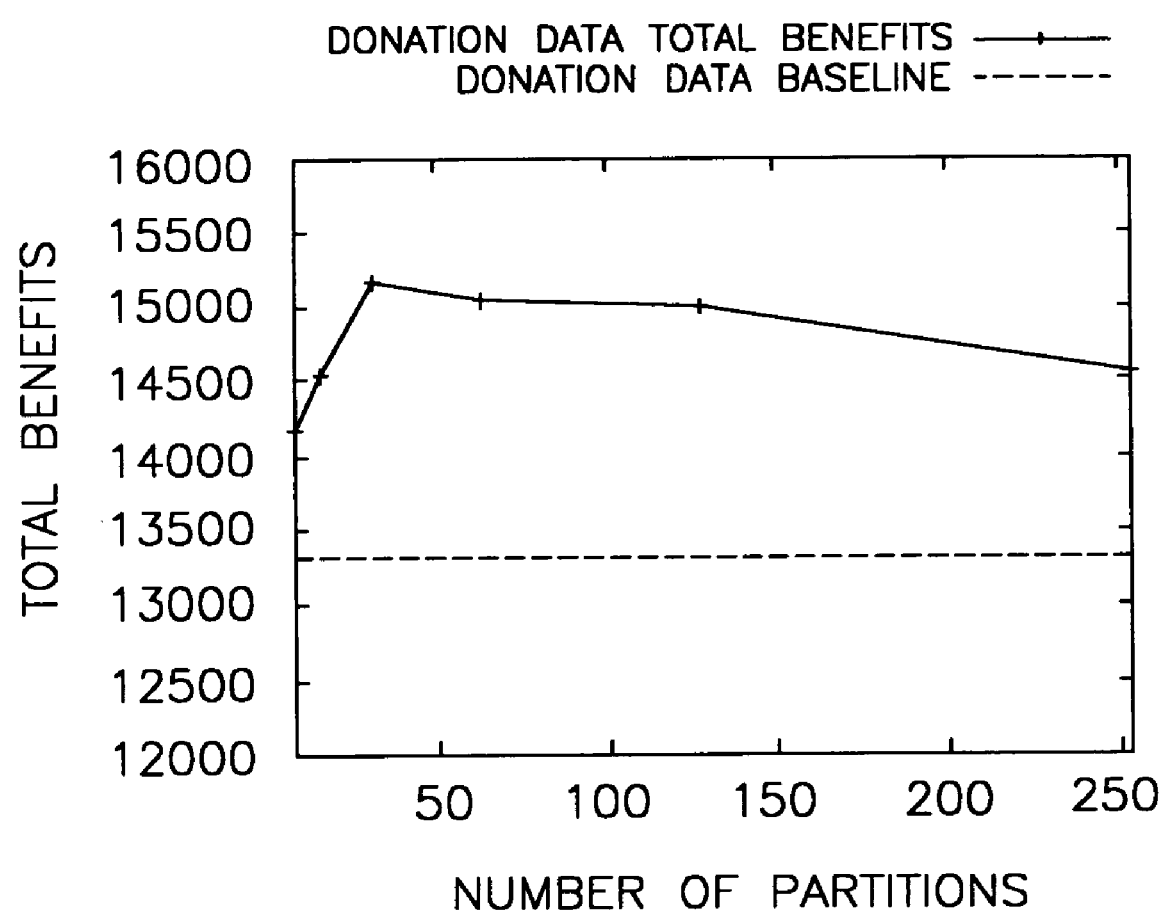
FIG. 1C is a plot of donation data benefits derived from experimentation.

We next study the trends of accuracy when the number of partitions K increases. In FIGS. 1A, 1B and 1C, we plot the accuracy and total benefits for the credit card data sets, and the total benefits for the donation data set with increasing number of partitions K. C4.5 was the base learner for this study. As we can see clearly that for the credit card data set, the multiple model consistently and significantly improve both the accuracy and total benefits over the single model by at least 1% in accuracy and $40000 in total benefits for all choices of K. For the donation data set, the multiple model boosts the total benefits by at least $1400. Nonetheless, when K increases, both the accuracy and total benefits show a slow decreasing trend. It would be expected that when K is extremely large, the results will eventually fall below the baseline.

Another important observation is that the accuracy and total benefit of the less than one scan algorithm are very close to the one scan algorithm. Their results are nearly identical.

In both Tables 1 and 2, we show the amount of data scanned for the less than one scan algorithm. It ranges from 40% (0.4) to about 70% (0.7). The adult dataset has the most amount of data scanned since the training set is the smallest and it requires more data partitions to compute an accurate model. C4.5 scans more data than both RIPPER and NB. This is because we generate the completely unpruned tree for C4.5, and there are wide variations among different models.

In Table 3, we compare the differences in accuracy and amount of training data when the validation set is either read completely by every classifier (under "Batch") or sequentially only by newly computed base classifiers (under "Seq") (as discussed in Section 3). Our empirical studies have found that "Batch" mode usually scans approximately 1% to 2% more training data, and the models computed by both methods are nearly identical in accuracy. The extra training data from the "batch" method is due to the fact that some examples satisfied by previously learned classifiers have high probability, but may not necessarily be satisfied by more base classifiers. However, our empirical studies have shown that the difference in how the validation set is handled doesn't significantly influence the final model accuracy.

When a data is biased in its distribution, the less than one scan algorithm needs to scan more data than in uniform distribution to produce an accurate model. With the same amount of datascan, it may not have the same accuracy as uniform distribution. We have created a "trap" using the credit card dataset. We sorted the training data with increasing transaction amount. The detailed results are shown in Table 4(a) and (b). The accuracy (and total benefits) in Table 4(a) are nearly identical to the results of "natural distribution" as reported in Tables 1 and 2. However, the amount of datascan by the less than one scan algorithm is over 0.9 as compared to approximately 0.6 for natural distribution. As shown in Table 4(b), when the datascan is less than 0.9 (the confidence is not satisfied and less one scan will continue to compute more model), the total benefits are much lower. When distribution is biased, the variations in base classifiers' prediction are wider. It requires more data to compute an accurate model and the less than one scan algorithm is performing in the correct way.

Figure 2:
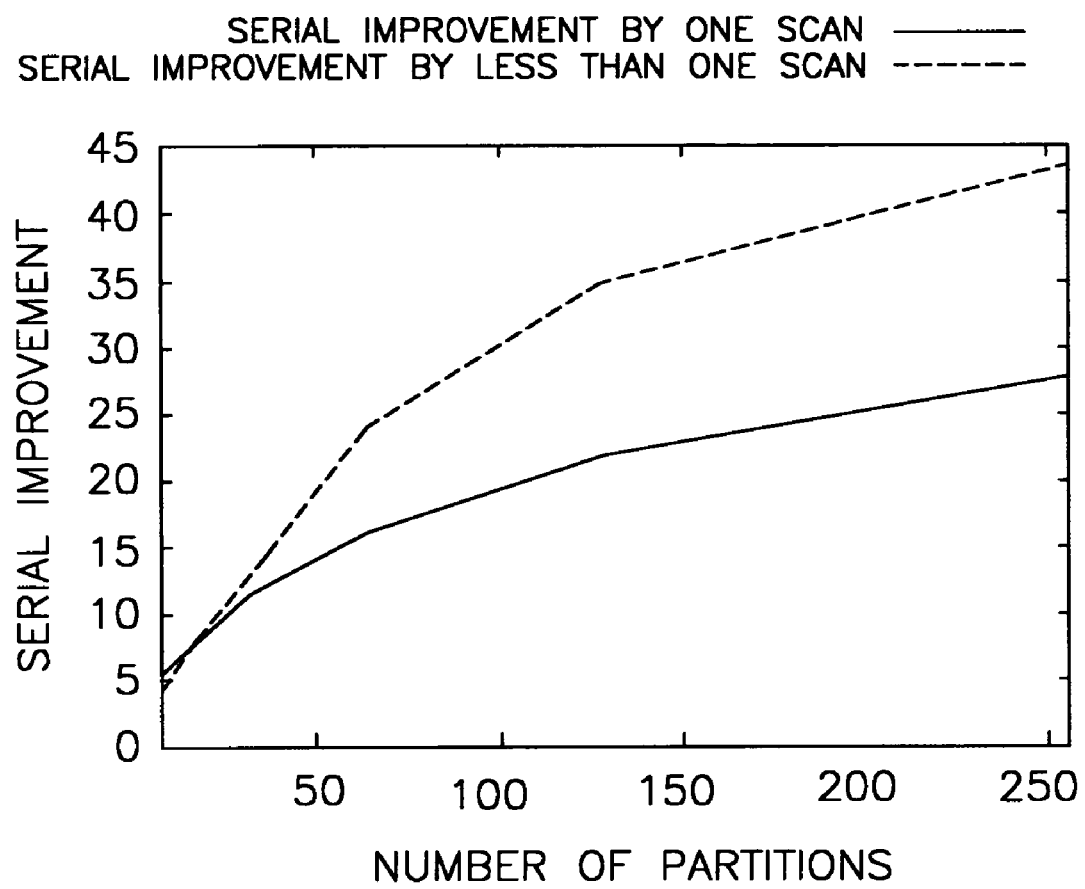
FIG. 2 comparatively plots serial improvements obtained in accordance with an embodiment of the present invention over conventional results.

In connection with training efficiency, we recorded both the training time of the batch mode single model, and the training time of both the one scan algorithm and less than one scan algorithm plus the time to classify the validation set multiple times and statistical estimation. We than computed serial improvement, which is the ratio that the one scan and less than one scan algorithm are faster than training the single model. In FIG. 2, we plot results for the credit card dataset using C4.5. Our training data can fit into the main memory of the machine. Any single classifier algorithm that reduces the number of data scan [9, 5, 6, 8] will not have training time less than this result. As shown in FIG. 2, both one scan and less than one scan algorithm are significantly faster than the single classifier, and the less than one scan algorithm is faster than the one scan algorithm.

One of the biggest suspicions people have towards multiple models or ensembles is accuracy. Previous experiments have shown than ensemble of classifiers is less accurate than a single model. There is no explanation of why an ensemble works and when it will fail. However, statistical reasons using the "smoothing effect" can be pointed to. In addition, the accuracy estimation by the random-distribution method also predicts when the method will fail. Even none of the existing single model methods can predict when it will fail.

By way of recapitulation, there are proposed herein, in accordance with at least one presently preferred embodiment of the present invention, two scaleable inductive learning algorithms. The strawman multiple model algorithm scans the data set exactly once. There is then proposed a less than one scan extension based on Hoeffding's inequality. It returns a partial multiple model when its accuracy is the same as the complete multiple model with confidence $\geq p$. Since the Holding inequality makes no assumption about the data distribution, the advantage of this method is that the data items can be retrieved sequentially.

There has also been discussed herein a manner of sequentially reading the validation set exactly once using minimal memory. We have evaluated these methods on several data sets as both traditional accuracy-based and cost-sensitive problems using decision tree, rule and naive Bayes learners. We have found that the accuracy of all our methods are the same or far higher than the single model. The amount of data scan by the less than one scan algorithms range from 0.45 to 0.7 for the original natural distribution of data. For a significantly biased dataset, the amount of datascan by the less than one scan algorithm is over 0.9. It needs extra data to resolve the bias in data distribution in order to compute an accurate model.

There were also empirically measured herein the efficiency of both one scan and less than one scan algorithms. In addition, our empirical studies have shown that both methods are significantly faster than computing a single model even when the training data can be held in main memory, and the less than one scan algorithm is faster than the one scan algorithm. The best known scaleable decision tree algorithm scans the data set twice. Our algorithms can be applied to many inductive learners, including decision trees.

It is to be understood that the present invention, in accordance with at least one presently preferred embodiment, includes an arrangement for scanning at least a portion of an input large data set, which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] Leo Breiman. Bagging predictors. *Machine Learning*, 24(2): 123-140, 1996.

[2] P Chan. *An Extensible Meta-learning Approach for Scaleable and Accurate Inductive Learning*. PhD thesis, Columbia University, October 1996.

[3] Wei Fan, Haixun Wang, Pilip S Yu, and Salvatore Stolfo. A framework for scaleable cost-sensitive learning based on combining probabilities and benefits. In *Second SIAM International Conference on Data Mining (SDM2002)*, April 2002.

[4] Y Freund and R Schapire. A decision-theoretic generalization of on-line learning and an application to boosting. *Computer and System Sciences*, 55(1): 119-139, 1997.

[5] Johannes Gehrke, Venkatesh Ganti, and Raghu Ramakrishnan. RainForest: a framework for fast decision construction of large datasets. In *Proceeding of 24th International Conference on Very Large Databases (VLDB'1998)*, 1998.

[6] Johannes Gehrke, Venkatesh Ganti, Raghu Ramakrishnan, and Wei-Yin Loh. BOAT-optimistic decision tree construction. In *Proceedings of ACM SIGMOD International Conference on Management of Data (SIGMOD 1999)*, 1999.

[7] Joseph M. Hellerstein, Peter J. Haas, and Helen J. Wang. Online aggregation. In *Proceedings of ACM SIGMOD International Conference on Management of Data (SIGMOD'97)*, 1997.

[8] Geolff Hulten and Pedro Domingos. Learniing from infinite data in finite time. In *Advances in neural information processing systems*. MIT Press, 2002.

[9] J Shafer, Ramesh Agrawl, and M Mehta. SPRINT: A scaleable parallel classifier for data mining. In *Proceedings of Twenty-second International Conference on Very Large Databases (VLDB-96)*, pages 544-555, San Francisco, Calif., 1996. Morgan Kaufmann.

APPENDIX

Train(S, $S_V$, k, p)

Data : training set S, validation set SV, partition number K, confidence p

Result : multiple model with size k ≦ K

```
begin
    partition S into K disjoint subsets of equal size {S_1, ..., S_K};
    train C_1 from S_1;
    test C_1 on SV;
    k ← 1;
    while k ≦ K do
        train C_k from S_k;
        test C_k on SV;
        ∀l_i, compute Hoeffding error ε_k(l_i) (Eq[8]);
        confidence_satisfied ← true;
        for x ∈ SV do
            ∀l_i, compute E(l_i|x);
            E(l_a|x) is the highest and E(l_b|x) is the second highest;
            if E(l_a|x) + E(l_b|x) ≦ ε_k(l_a) + ε_k(l_b) then
                confidence_satisfied ← false;
                break;
            end
        end
        if confidence_satisfied then
            return {C_1, ... C_k }
        end
        else
            k ← k + 1
        end
    end
    return {C_1, ... C_k }
end
```

Algorithm 1: Less than one data scan

TABLE 1

| | Single | OneScan | LessThanOne accuracy | datascan |
|---|---|---|---|---|
| | | C4.5 | | |
| Donation | 94.94% | 94.94% | 94.94% | 0.61 |
| Credit Card | 87.77% | 90.37% | 90.41% | 0.62 |
| Adult | 84.38% | 85.6% | 85.0% | 0.76 |
| | | RIPPER | | |
| Donation | 94.94% | 94.94% | 94.94% | 0.45 |
| Credit Card | 90.14% | 91.46% | 91.42% | 0.56 |
| Adult | 84.84% | 86.1% | 86.0% | 0.59 |
| | | NB | | |
| Donation | 94.94 | 94.94% | 94.94% | 0.51 |
| Credit Card | 85.46% | 88.64% | 88.71% | 0.57 |
| Adult | 82.86% | 84.94% | 84.6% | 0.61 |

TABLE 2

| | Single | OneScan | LessThanOne benefit | datascan |
|---|---|---|---|---|
| | | C4.5 | | |
| Donation | $13292.7 | $14702.9 | $14828 | 0.71 |
| Credit Card | $733980 | $804964 | $804914 | 0.65 |
| Adult | $16443 | $16435 | $16205 | 0.77 |
| | | RIPPER | | |
| Donation | $0 | $0 | $0 | 0.47 |
| Credit Card | $712541 | $815612 | $815310 | 0.57 |
| Adult | $19725 | $19875 | $19615 | 0.62 |
| | | NB | | |
| Donation | $13928 | $14282 | $14278 | 0.55 |
| Credit Card | $704285 | $798943 | $799104 | 0.59 |
| Adult | $16269 | $19169 | $16102 | 0.63 |

TABLE 3

| | Accuracy | | Data Scan | |
|---|---|---|---|---|
| | Batch | Seq | Batch | Seq |
| | | C4.5 | | |
| Donation | 94.94% | 94.94% | 0.64 | 0.61 |
| Credit Card | 90.39% | 90.41% | 0.62 | 0.62 |
| Adult | 85.1% | 85.0% | 0.78 | 0.76 |
| | | RIPPER | | |
| Donation | 94.94% | 94.94% | 0.48 | 0.45 |
| Credit Card | 91.44% | 91.42% | 0.56 | 0.55 |
| Adult | 85.9% | 86.0% | 0.62 | 0.59 |

TABLE 3-continued

| | Accuracy | | Data Scan | |
| --- | --- | --- | --- | --- |
| | Batch | Seq | Batch | Seq |
| NB | | | | |
| Donation | 94.96% | 94.94% | 0.54 | 0.51 |
| Credit Card | 88.62% | 88.71% | 0.59 | 0.57 |
| Adult | 84.84% | 84.6% | 0.62 | 0.61 |

TABLE 4

| | Accuracy Based | | Cost-sensitive | |
| --- | --- | --- | --- | --- |
| | Accuracy | DataScan | Benefit | Datascan |
| C4.5 | 89.7% | 0.95 | $794933 | 0.96 |
| RIPPER | 90% | 0.93 | $769344 | 0.97 |
| NB | 86.9% | 0.89 | $774854 | 0.93 |

(a). Performance for different classifier for biased distribution

| DataScan | 0.6 | 0.7 | 0.8 | 0.96 |
| --- | --- | --- | --- | --- |
| Total Benefits | $561382 | $614575 | $728315 | $794933 |

(b). Performance of C4.5 with different amount of data scanned under the biased distribution

What is claimed is:

1. An arrangement for effecting inductive learning for a large data set, said arrangement being executed by a processor comprising:

an arrangement for scanning at least a portion of an input large data set; and an arrangement for returning the scanned portion of the input large data set;

wherein said scanning arrangement is adapted to:

act in accordance with an averaging ensemble algorithm; and apply a Hoeffding's inequality to:

reduce needed scanning from a full single scan of the entire input large data set to less than a full scan of the entire input large data set; and estimate a probability that a partial and a complete model associated with the input large data set are equivalent in accuracy.

2. The arrangement according to claim 1, wherein said scanning arrangement acts in accordance with a statistically-based inductive learning algorithm.

3. The arrangement according to claim 1, wherein said scanning arrangement acts in accordance with a multiple model inductive learning algorithm.

4. The arrangement according to claim 1, wherein said scanning arrangement acts in accordance with an averaging ensemble algorithm.

5. The arrangement according to claim 1, wherein the input large data set is provided in a continuous data stream environment.

6. The arrangement according to claim 1, wherein said scanning arrangement is adapted such that, when the probability is higher than a threshold, the averaging ensemble algorithm stops model construction and returns a current model.

7. A method of effecting inductive learning for a large data set, said method being executed by a processor comprising the steps of:

scanning at least a portion of an input large data set; and returning the scanned portion of the input large data set;

wherein said scanning step comprises:

scanning in accordance with an averaging ensemble algorithm; and applying a Hoeffding's inequality to:

reduce needed scanning from a full single scan of the entire input large data set to less than a full scan of the entire input large data set; and estimate a probability that a partial and a complete model associated with the input large data set are equivalent in accuracy.

8. The method according to claim 7, wherein said scanning step is performed in accordance with a statistically-based inductive learning algorithm.

9. The method according to claim 7, wherein said scanning step is performed in accordance with a multiple model inductive learning algorithm.

10. The method according to claim 7, wherein said scanning step is performed in accordance with an averaging ensemble algorithm.

11. The method according to claim 7, wherein the input large data set is provided in a continuous data stream environment.

12. The method according to claim 7, wherein said scanning step is performed such that, when the probability is higher than a threshold, the averaging ensemble algorithm stops model construction and returns a current model.

13. A program storage device readable by machine, tangibly embodying a program of instructions executable by the machine to perform method steps for effecting inductive learning for a large data set, said method comprising the steps of:

scanning at least a portion of an input large data set; and returning the scanned portion of the input large data set;

wherein said scanning step comprises:

scanning in accordance with an averaging ensemble algorithm; and applying a Hoeffding's inequality to:

reduce needed scanning from a full single scan of the entire input large data set to less than a full scan of the entire input large data set; and estimate a probability that a partial and a complete model associated with the input large data set are equivalent in accuracy.

* * * * *